T. HUMPAGE.
SAW SHARPENING MACHINE.
APPLICATION FILED AUG. 25, 1913.

1,115,940.

Patented Nov. 3, 1914.
2 SHEETS—SHEET 1.

Inventor
Thomas Humpage

T. HUMPAGE.
SAW SHARPENING MACHINE.
APPLICATION FILED AUG. 25, 1913.
1,115,940.
Patented Nov. 3, 1914.
2 SHEETS—SHEET 2.
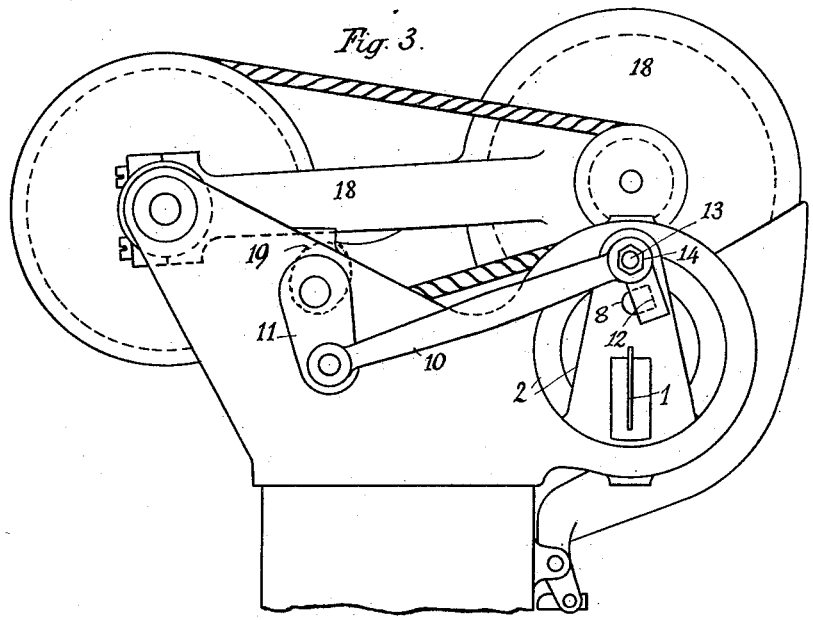
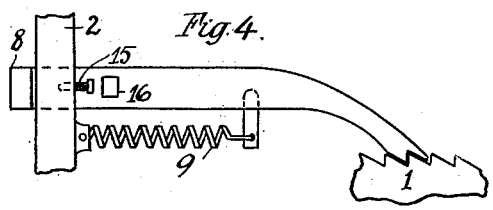
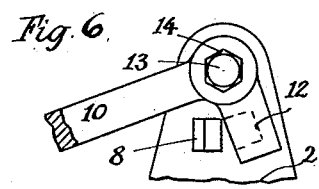
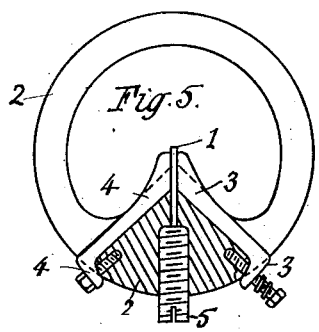
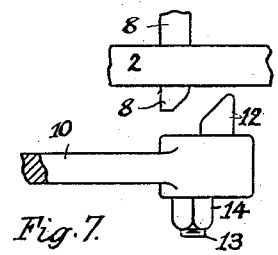

UNITED STATES PATENT OFFICE.

THOMAS HUMPAGE, OF BRISTOL, ENGLAND.

SAW-SHARPENING MACHINE.

1,115,940.  Specification of Letters Patent. Patented Nov. 3, 1914.

Application filed August 25, 1913. Serial No. 786,612.

*To all whom it may concern:*

Be it known that I, THOMAS HUMPAGE, a subject of the King of England, residing at Bristol, in Gloucestershire, in the Kingdom of England, have invented a new and useful Improvement in Saw-Sharpening Machines, of which the following is a specification.

My invention has for its object to provide a saw-sharpening machine in which the saw-blade, on being advanced tooth by tooth and subjected to the action of an abrasive wheel, receives lateral rocking motion so that the teeth are ground to the arc of a circle or other curve thereby removing the square corners and greatly increasing the efficiency of the saw.

Further objects are to provide a pivoted arm for carrying the abrasive wheel, means for adjustably limiting the descent of same, and means for actuating the forward feed of the saw by the rocking member of same.

These and other objects are attained by the combined mechanism hereinafter fully described with reference to the annexed drawings, in which:—

Figure 1:
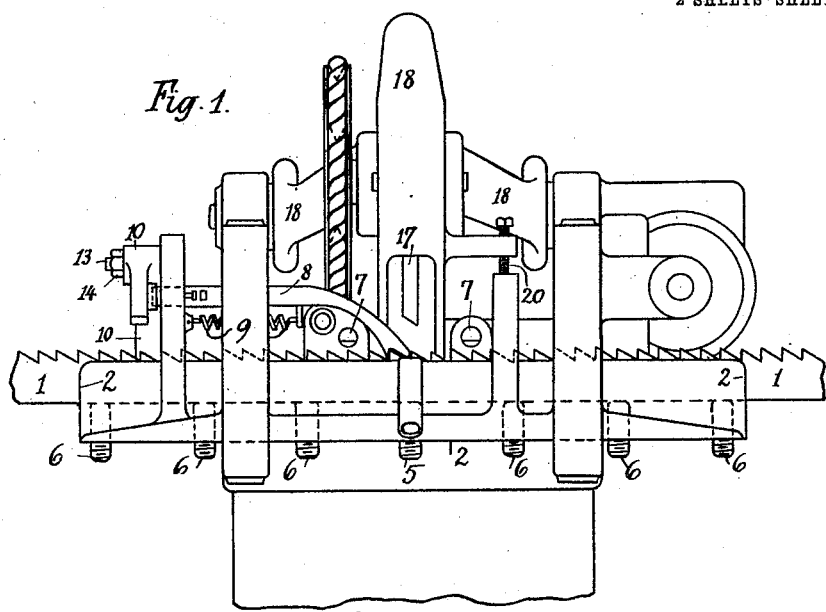
Figure 2:
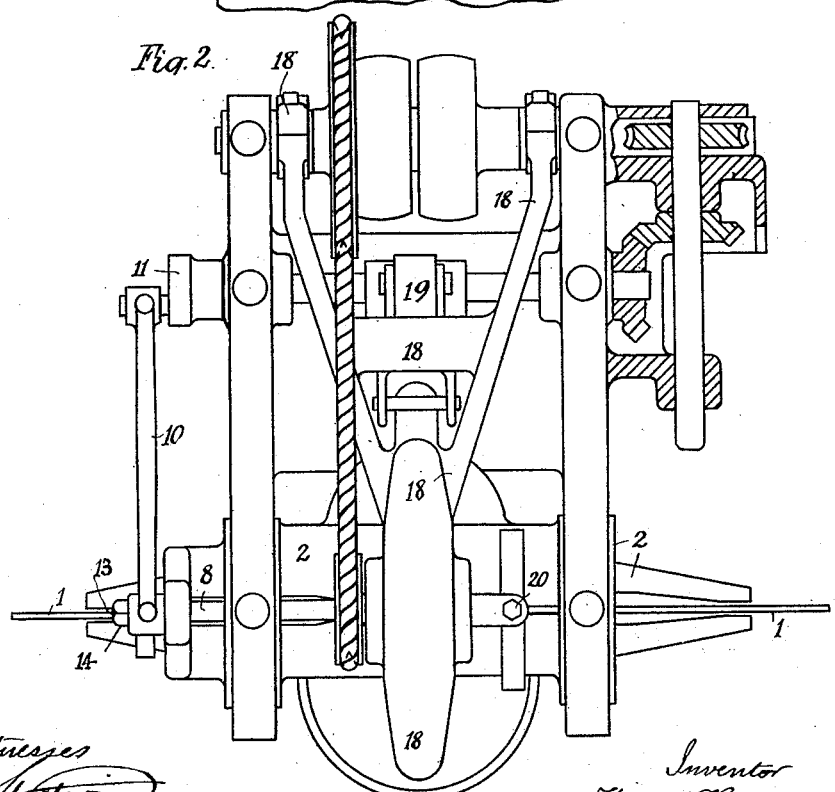

Figure 1 is a front elevation; Fig. 2, a corresponding plan, partly in section; Fig. 3, a side elevation of the machine; Fig. 4 represents the feeding bar which feeds the saw blade forward to the abrasive wheel, a tooth at a time; Fig. 5 represents the rocking cradle in which the saw blade is held, in cross-section; Fig. 6 represents the end of the connecting rod and the feeding bar in end elevation and Fig. 7 represents the end of the connecting rod and feeding bar in plan. Figs. 4 to 7 are drawn to a larger scale.

In all the figures the same reference characters denote the same parts.

The saw blade 1 to be sharpened is carried in a rocking cradle 2 the length of the blade being arranged so as to be truly parallel to the axis of the cradle. The vertical position of the blade with relation to the axis of the cradle is capable of adjustment as described later, so that the axis about which the blade rocks is situated at some predetermined point near the roots of the teeth.

The saw blade is not rigidly fixed in the rocking cradle but is held while each tooth is ground by means of suitably arranged spring-pressed plungers 3 which press the side of the blade 1 against adjustable arms 4 in the body of the cradle. The strength of the spring-pressed plungers 3 is such that while the blade is efficiently held during the process of grinding it may be fed forward as described later without any movement of the spring-plungers. The purpose of the adjustable arms 4 is to allow of blades of different thickness being accurately centralized in the rocking cradle. The back of the saw blade is supported by an adjustable setting screw 5 in the cradle. At each end of the cradle other adjustable supports 6 are provided to keep the teeth of the saw-blade parallel to the axis of the said cradle. Two fixed stops 7 for locating the saw-blade in a vertical direction are provided in the cradle just above the teeth of the saw one on each side of the center of the adjustable screw 5. A setting gage rod or bar is provided which can be placed between the tops of the teeth of the saw-blade and the said fixed stops 7. The saw-blade is then raised by the adjusting screw 5 until the setting gage rod is slightly gripped between the tops of the teeth and the two fixed stops 7. The setting gage rod is then withdrawn, leaving the tops of the teeth at the required distance above the axis. Thicker or thinner setting gage rods can be used to alter the distance of the tops of the teeth above the axis of the cradle and thereby, as explained later, the arc to which the teeth are ground will be made smaller or larger.

A feeding bar 8 is slidingly carried in an end arm of the cradle and projects slightly at one end of it. The inner end of the feeding bar is provided with a few teeth of the same pitch as the saw to be sharpened. Different bars 8 are provided for different pitches of the saw teeth. The teeth on the feeding bar 8 are caused at certain times to mesh with the teeth of the saw 1 and push it forward through the cradle, the pressure being so exerted as to always keep the back of the saw in contact with the adjustable setting screw 5. The feeding bar 8 is returned by means of a spring 9 attached to the body of the cradle 2 and the bar 8 respectively. The cradle is given a rocking motion by means of a connecting rod 10 driven by a crank 11. The end of the connecting rod which is attached to the cradle is provided with a beveled lug 12 which comes in contact with the projecting oppositely beveled end of the feeding bar 8, pressing it in and thereby causing the saw blade to be moved forward through the space of one tooth.

The distance traversed by the feeding bar on its forward stroke is capable of adjustment in two ways. First the end of the connecting rod which is provided with the lug 12 is capable of slight movement laterally upon the end of the crank pin 13, the distance between the body of the cradle and the back face of the lug being regulated by a nut 14 on the crank pin. By this means the amount by which the feeding bar projects from the cradle body when it has reached the forward end of its stroke is adjusted, thus determining the forward limit of the stroke. The second adjustment is made by a screw 15 carried in the body of the cradle 2. This screw bears against a projection 16 upon the feeding bar when the latter is in its backward position. By this means it is possible to determine the backward limit of the stroke of the feeding bar.

An abrasive wheel 17 is carried on an arm 18, which is raised and lowered by a cam 19. This arm is provided with a fine adjustment, to compensate for the wear of the abrasive wheel, by a locking screw 20, which bears upon the rim or outer surface of the rocking cradle 2. This locking screw limits the depth to which the emery wheel can travel toward the axis of the cradle.

A gage setting block is provided which passes between a gap in the cradle and the grinding edge of the abrasive wheel for setting the edge of the abrasive wheel to the exact grinding depth from the axis of the cradle. The reason for giving the saw-blade a rocking motion during the process of sharpening is to insure that all the teeth are of equal height and ground to a true arc of a circle or other curvature over the tops, thereby greatly increasing the efficiency of the saw. In place of a cylindrical outer surface, of the cradle 2 upon which the locking screw 20 bears, I may shape this surface to various forms and thereby grind the tops of the teeth to any other curved form.

I claim:

1. A hack-saw sharpening machine comprising operating mechanism and means for mechanically rocking the saw-blade laterally during the sharpening operation, means in combination with said rocking means for advancing the saw-blade tooth by tooth, a traveling abrasive wheel, and means for limiting the descent of said wheel, as described.

2. In a hack-saw sharpening machine, the combination with a bed, of a rocking cradle, means for securing a saw-blade teeth upward in said cradle, means for automatically advancing the saw-blade in its cradle, an abrasive wheel, and mechanism for rocking said cradle and for operating the abrasive wheel, as described.

3. In a hack-saw sharpening machine, the combination with a bed, of a lower rocking cradle, means for horizontally adjusting a saw-blade in and parallel to the axis of said cradle, means for advancing the saw-blade in said cradle, an abrasive wheel, and operating mechanism for said parts, as described.

4. In a hack-saw sharpening machine, the combination with a bed, of a transverse rocking cradle, means for horizontally adjusting a saw-blade in said cradle, means for centralizing the saw blade and means for advancing the saw-blade in said cradle, an abrasive wheel, a swing arm carrying said wheel, and operating mechanism for said parts, as described.

5. In a hack-saw sharpening machine, the combination with a bed, of a rocking cradle, means for adjustably securing a saw-blade in the cradle, a crank and connecting rod for rocking the latter, means on the cradle for advancing the blade, means on the connecting rod for controlling the advance, an abrasive wheel, and operating mechanism for said parts, as described.

6. In a hack-saw sharpening machine, the combination with a bed, of a rocking cradle, means for adjustably securing a saw-blade in the cradle, a feed bar, with teeth to mesh those of the saw-blade, slidably mounted in said cradle, a connecting rod to rock the same, a beveled lug on the connecting rod to move the feed bar, an abrasive wheel, and operating mechanism for said parts, as described.

7. In a hack-saw sharpening machine, the combination with a bed, of a rocking cradle, means for adjustably securing a saw-blade in the cradle, a feed bar slidably mounted in said cradle, a spring for returning the feed bar, an abrasive wheel, and operating mechanism for said parts, as described.

8. In a hack-saw sharpening machine, the combination with a bed, of a rocking cradle, means for adjustably securing a saw-blade in the cradle, means for rocking the latter, a feed bar slidably mounted in said cradle and meshing with the saw-blade, means for operating and adjusting the forward stroke of said feed bar, means for limiting the rearward stroke of same, an abrasive wheel, and operating mechanism for said parts, as described.

9. In a hack-saw sharpening machine, the combination with a bed, of a rocking cradle, means for adjustably securing a saw-blade in said cradle, a controlled feed bar mounted in the latter, an abrasive wheel, a pivoted arm carrying said wheel, coöperating means connected with said arm and with the cradle for controlling the swing of the arm, and operating means for said parts, as described.

THOMAS HUMPAGE.

Witnesses:
E. J. FUSSELL,
DANIEL BRITT.

Copies of this patent may be obtained for five cents each, by addressing the "Commissioner of Patents, Washington, D. C."